United States Patent

Taniguchi et al.

[11] Patent Number: 5,860,062
[45] Date of Patent: Jan. 12, 1999

[54] SPEECH RECOGNITION APPARATUS AND SPEECH RECOGNITION METHOD

[75] Inventors: Kenichi Taniguchi, Fukuoka; Nobuyuki Kono; Toshimichi Tokuda, both of Fukuoka-ken; Yoshio Ikura, Kasuga, all of Japan

[73] Assignee: Matsushita Electric Industrial Co., Ltd., Osaka, Japan

[21] Appl. No.: 874,331

[22] Filed: Jun. 13, 1997

[30] Foreign Application Priority Data

Jun. 21, 1996 [JP] Japan .................................. 8-161357
Jan. 10, 1997 [JP] Japan .................................. 9-002647
Feb. 19, 1997 [JP] Japan .................................. 9-034575

[51] Int. Cl.$^6$ ...................................................... G01L 5/06
[52] U.S. Cl. ........................... 704/256; 704/226; 704/233
[58] Field of Search ................................... 704/256, 251, 704/252, 226, 233

[56] References Cited

U.S. PATENT DOCUMENTS

5,721,808  2/1998  Minami et al. ........................ 704/256

Primary Examiner—David D. Knepper
Assistant Examiner—Susan Wieland
Attorney, Agent, or Firm—Venable; Robert J. Frank

[57] ABSTRACT

A speech recognition apparatus and method learns in advance a plurality of kinds of noises that can occur in the environment of use to determine a plurality of noise HMMs, synthesizes these noise HMMs into one noise HMM, generates a NOVO-HMM by executing NOVO (voice mixed with noise) conversion for a speech HMM of a reference pattern by using this composite noise HMM, and uses this NOVO-HMM for a speech recognition processing. Since a plurality of noises are incorporated in the NOVO-HMM generated in this manner, the speech can be recognized with high accuracy even when the noise changes.

10 Claims, 10 Drawing Sheets

FIG. 3    FLOWCHART AT THE TIME OF LEARNING:

"pat01p7.spc"

FIG. 10

"pat01p8.spc"

FIG. 11
PRIOR ART

SPEECH RECOGNITION APPARATUS AND SPEECH RECOGNITION METHOD

BACKGROUND OF THE INVENTION

This invention relates to a speech recognition apparatus and a speech recognition method each using an HMM system.

One of the means that have gained a wide application for automatic recognition of speech by computers is a so-called "Hidden Markov Model" (hereinafter called the "HMM"). First, a speech recognition method by the HMM will be explained.

The HMM has N states S1, S2, ... SN, transits one after another the states with a certain probability (transition probability) in a predetermined cycle and outputs one by one a label (feature data) with a certain probability (output probability). When a speech is regarded as a time series of labels (feature data), an HMM which models each word is generated at the time of learning by uttering several times the word. To recognize an unknown input speech, an HMM having the maximum probability of outputting a label series coincident with the label series of the input speech is searched, and a word corresponding to this HMM is designated as the output result. This means is called "the maximum likelihood estimation method".

More particularly, HMMs are prepared for each group of speech samples of a person as the recognition object and for each word as the recognition object at the time of learning. Internal parameters defining each HMM are adjusted so that the HMM can more easily output a feature data series extracted from the speech sample group as the recognition object. In this instance, the internal parameters of the HMM are adjusted by using a forward-backward algorithm, and the internal parameters that match the word as the recognition object are set to each HMM.

When an unknown speech is inputted, the degree of easiness (likelihood) of outputting the feature data series extracted from the unknown speech is calculated for each HMM, and the word corresponding to the HMM that outputs the maximum likelihood is designated as the recognition result.

If the HMM of each word is learned in advance for each word and the internal parameters corresponding to the word, that is, the transition probability of the state most suitable for each word and the output probability of the label under each state transition, is determined in advance, it becomes possible to know which HMM for which word can easily output the label series by executing the probability (likelihood) calculation when a label series of an unknown word is inputted, and the word can be thus recognized.

One of the means for recognizing a speech with an overlapping noise is the one that uses a NOVO-HMM proposed by Franc Martin in the reference "Recognition of Noisy Speech by Composition of Hi" (technical report SP92-96 of the Communication Society). This means synthesizes the internal parameters of the HMM generated from the noise that is, "noise HMM", and the "speech HMM of a reference pattern" by the method called "NOVO" (voice mixed with noise) conversion in the reference, and recognizes the speech overlapping with the noise with a high level of accuracy by using the "noise overlapping speech HMM", that is, a NOVO-HMM.

Figure 8:
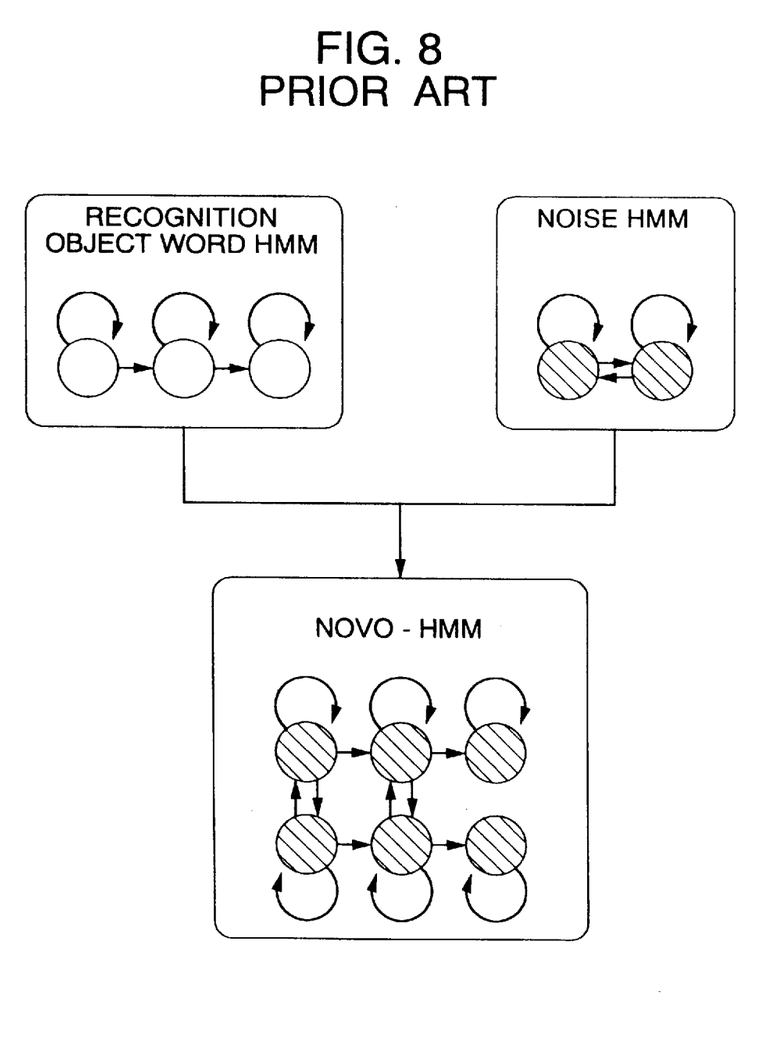
FIG. 8 is a conceptual view of NOVO conversion according to the prior art.

FIG. 8 of the accompanying drawings is a conceptual view of NOVO conversion. A reference speech HMM is created by learning using learning sample data of recognition object words, a noise HMM is created by learning using learning sample data of the noises, these reference speech HMM and noise HMM are synthesized by NOVO conversion, and a NOVO-HMM is obtained for each recognition object word.

Figure 9:
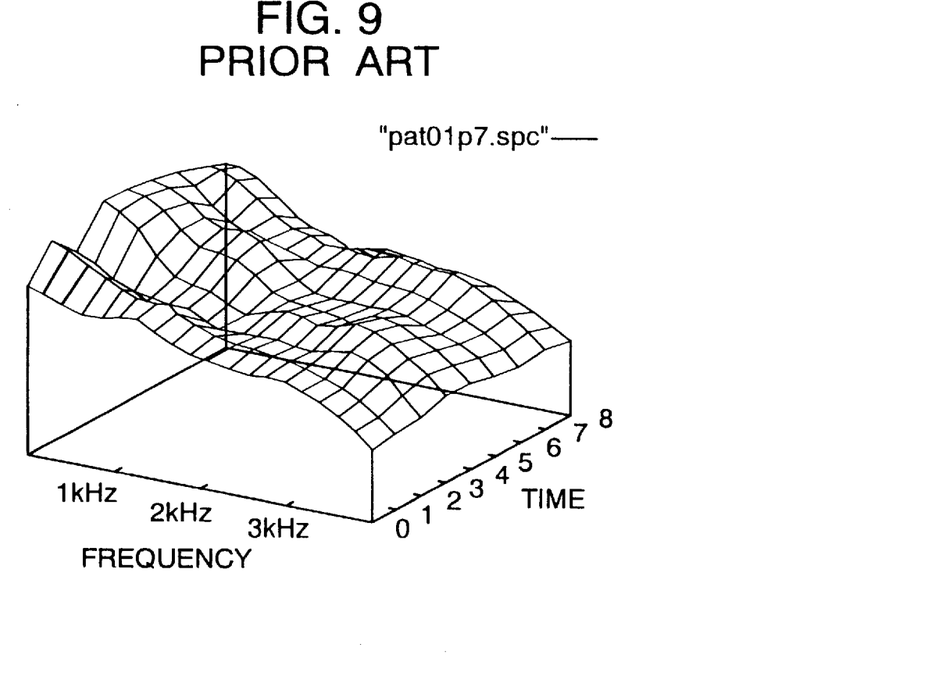
FIG. 9 is a conceptual view of a logarithmic spectrum determined by NOVO-HMM according to the prior art.

FIG. 9 is a conceptual view of a logarithmic spectrum expressed by the HMM which is obtained by directly inputting the speech with the overlapping noise. It can be appreciated that their profiles are somewhat different. In consequence, the drop of a recognition ratio develops.

Figure 11:
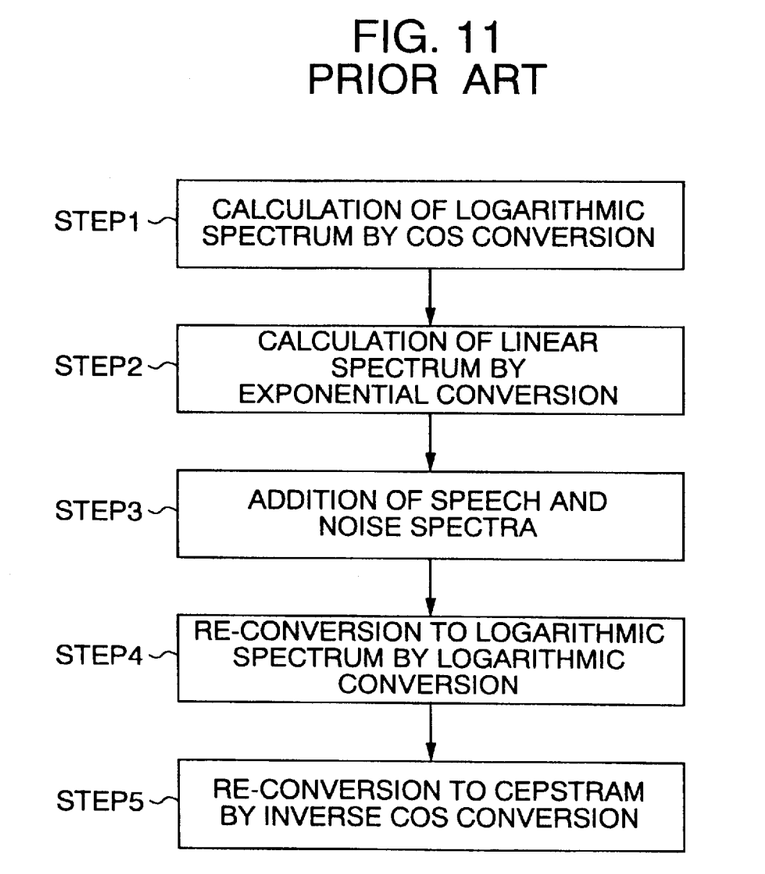
FIG. 11 is a flowchart of a calculation procedure of internal parameters of HMM in NOVO conversion according to the prior art.

FIG. 11 is a flowchart of the calculation procedure of the internal parameters of the HMM in NOVO conversion according to the prior art. In NOVO conversion according to the prior art, a cepstram as the internal parameter of the reference speech HMM and the noise HMM is converted to a logarithmic spectrum by COS conversion (step 1).

Next, each of them is converted to a linear spectrum by exponential conversion (step 2). Thereafter, the two linear spectra are added and a linear spectrum of the reference speech with the overlapping noise is created (step 3). The linear spectrum created in this way is returned to the logarithmic spectrum by logarithmic conversion (step 4). Inverse COS conversion is further executed so as to obtain the cepstram of the reference speech with the overlapping noise (step 5).

The calculation formula of the addition portion of the two linear spectra is expressed by the following equation 1 and 2 as described in the paragraph "HMM Composition" of the afore-mentioned Franc Martin reference:

(Eq. 1)

$$\mu^{R1n} = \mu^{S1n} + K(SNR) \times \mu^{N1n}$$

(Eq. 2)

$$\Sigma^{R1n} = \Sigma^{S1n} + k^2(SNR) \times \Sigma^{N1n}$$

Here, k(SNR) is expressed by the following equation 3:

(Eq. 3)

$$K(SNR) = \sqrt{\frac{S_{pow}}{N_{pow}}} \, 10^{\frac{-SNR}{20}}$$

In the formulas given above, $\mu$ represents a mean vector and $\Sigma$ represents the matrix of variance. Symbols R1n, S1n and N1n represent a noise overlapping speech, a speech and a noise, respectively. Symbol SNR represents a signal-to-noise ratio (S/N) at the time of overlap of the noise. Symbols Spow and Npow represent the mean values of power of the speech and the noise used for learning of each HMM, respectively.

The value k(SNR) in equation 3 is a parameter which varies with the S/N ratio of the noise overlapping speech or in other words, is a parameter which depends only on power of the noise but does not on the kind of the noise. For example, when a speech with which a noise is overlapped in such a manner as to set the S/N ratio to 0 dB (SNR=0) by setting power of the speech to an equal level of that of the noise at the time of learning, the value of k(SNR) becomes 1 (one) irrespective of the kind of the noise.

When the noise overlapping speech is recognized by such a recognition method using the NOVO-HMM, a satisfactory result can be obtained generally. However, this is based on the premise that the noise does not greatly change during the uttering time, and when the kind of the noise greatly changes during the uttering time, the recognition ratio drastically drops.

The recognition system according to the prior art synthesizes the speech HMM of the reference pattern and the "noise HMM" in the same way irrespective of the kind of the noise. Therefore, when the influences of the noise become great, the expression by the NOVO-HMM cannot sufficiently recognize the speech.

SUMMARY OF THE INVENTION

In view of the problems of the prior art technologies described above, the present invention is directed to provide a speech recognition apparatus and a speech recognition method capable of recognizing a speech overlapped with the noise, which changes during uttering of the speech, with a high level of accuracy, in speech recognition using the hidden Markov model under unsteady noises.

To accomplish this object, the speech recognition apparatus according to the present invention includes a steady noise learning portion for determining a steady noise HMM for each of a plurality of steady noise components and a noise synthesis portion for synthesizing one composite noise HMM from these steady noise HMMs, and executes NOVO conversion for the composite noise HMM acquired by synthesizing these steady noise HMMs and a speech HMM of a reference pattern. Therefore, even when the noise changes during uttering, this speech recognition apparatus can recognize the speech with high accuracy.

When a recognition object word HMM and a noise HMM are combined by NOVO conversion while taking S/N ratios of a plurality of levels into consideration, the present invention uses a plurality of coefficients corresponding to these S/N ratios, respectively, and can recognize the speech with a high probability even when the S/N ratio of the speech as the recognition object to that of the noise overlapping with the speech changes during uttering, too.

During the synthesizing process of the speech HMM of the reference pattern and the noise HMM, weighting is conducted by using a ratio of mean residual power of the speech to mean residual power of the noise (mean value of the difference of estimated power of the noise to actual power) as a coefficient and a NOVO-HMM expressing the speech overlapped with the noise is generated. In this way, when the NOVO-HMM for recognizing the noise overlapping speech is created, a NOVO-HMM having a higher level of accuracy can be generated by taking the weight of the synthesis of the speech HMM of the reference pattern and the noise HMM into consideration.

Furthermore, the procedure of generating and evaluating provisional NOVO-HMMs by applying arbitrarily a weighting coefficient is repeated in advance by changing the weighting coefficient so as to obtain a weighting coefficient having a high recognition ratio. A NOVO-HMM expressing the noise overlapping speech is generated by executing weighting by using the weighting coefficient so determined.

DESCRIPTION OF THE PREFERRED EMBODIMENTS

Hereinafter, a speech recognition apparatus and a speech recognition method according to some embodiments of the present invention will be explained with reference to the accompanying drawings.

(Embodiment 1)

Figure 1:
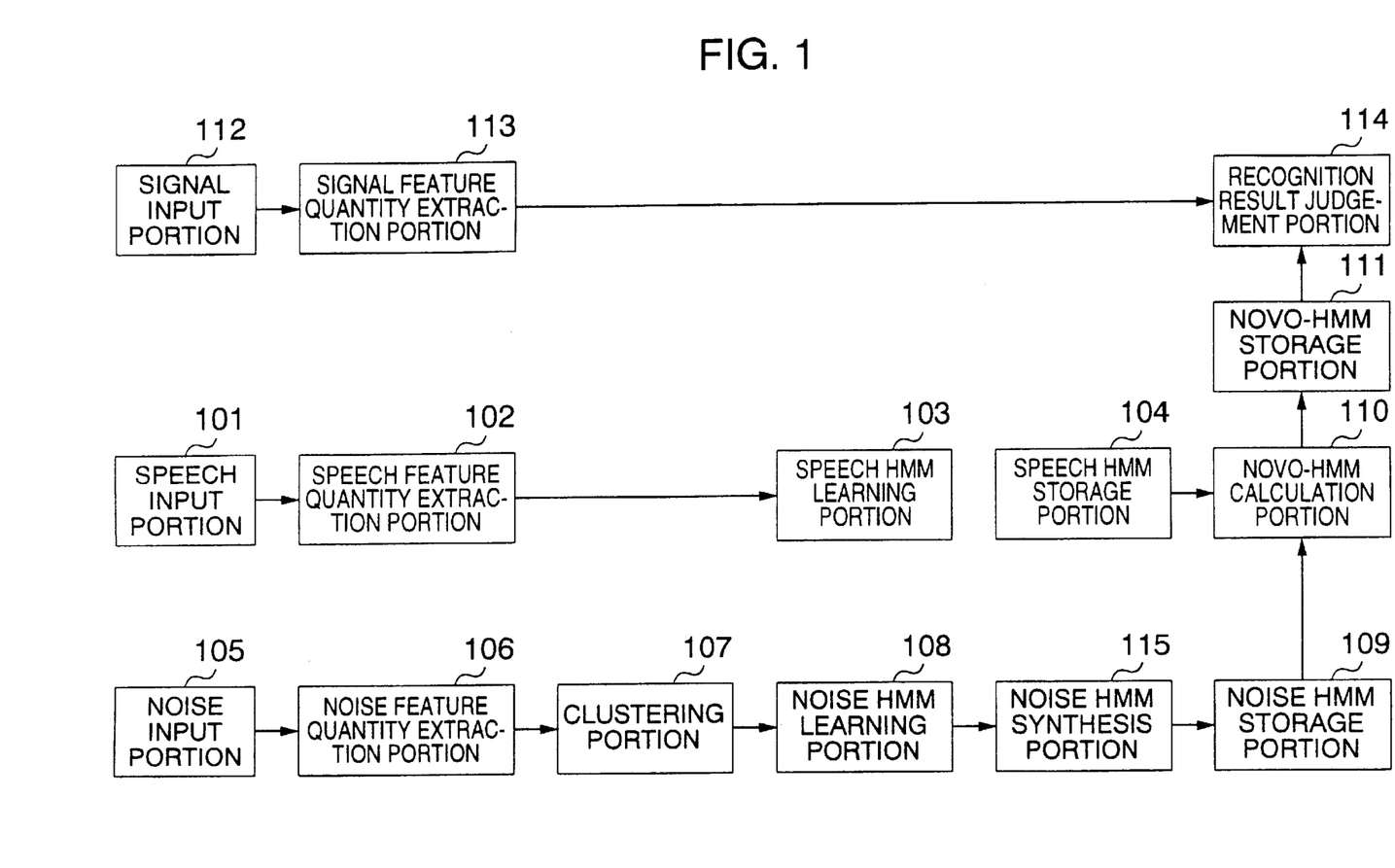
FIG. 1 is a structural block diagram of a speech recognition apparatus according to Embodiment 1 of the present invention.

FIG. 1 is a structural block diagram of a speech recognition apparatus according to Embodiment 1 of the present invention. Reference numeral 101 denotes a speech input portion for converting a speech signal, which is used for generating a reference pattern, to a digital value, reference numeral 102 denotes a speech feature quantity extraction portion for extracting a feature quantity for each frame from a reference pattern speech signal, reference numeral 103 denotes a speech HMM learning portion for generating HMM as a reference pattern for each word (hereinafter called "reference speech HMM") from a plurality of reference pattern speech feature quantities, and reference numeral 104 denotes a speech HMM storage portion for storing the reference speech HMM.

Reference numeral 105 denotes a noise input portion for converting a noise signal for generating a noise reference pattern to a digital value and reference numeral 106 denotes a noise feature quantity extraction portion for calculating a feature quantity from a noise signal for each frame. Reference numeral 107 denotes a clustering portion as a noise separation portion for gathering analogous analysis data from the noise feature quantity and clustering the data. Reference numeral 108 denotes a noise HMM learning portion for generating a noise HMM as a reference pattern for each noise from the noise feature quantity so clustered. Reference numeral 115 denotes a noise HMM synthesis portion for synthesizing respective noise HMMs to one noise HMM. Reference numeral 109 denotes a noise HMM storage portion for storing the noise HMM so synthesized.

Reference numeral 110 denotes a NOVO-HMM calculation portion for synthesizing the HMM of a noise overlapping speech by synthesizing the reference speech HMM and the noise HMM by the NOVO method, and reference numeral 111 denotes a NOVO-HMM storage portion for storing noise-overlapping reference speech HMMs.

Reference numeral 112 denotes a signal input portion for converting a speech signal as the object of speech recognition to a digital value, reference numeral 113 denotes a signal feature quantity extraction portion for calculating a feature quantity from the input signal for each frame, and reference numeral 114 denotes a recognition result judgement portion for calculating the output probability of the input word and deciding the recognition result.

Figure 2:
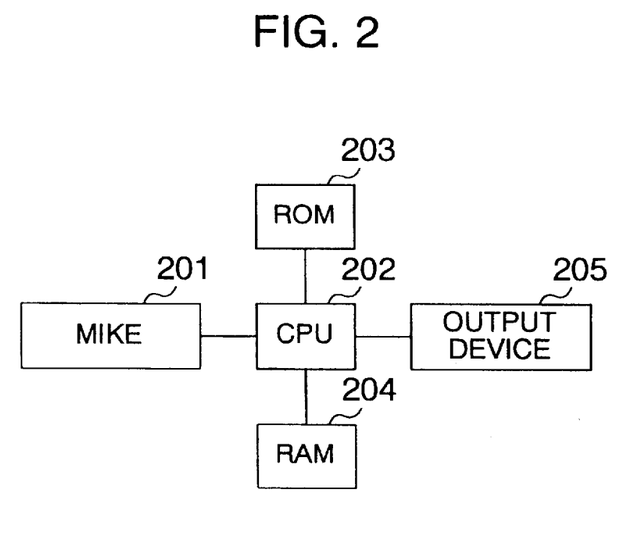
FIG. 2 is a circuit diagram of the speech recognition apparatus according to Embodiment 1 of the present invention.

FIG. 2 is a circuit block diagram of the speech recognition apparatus according to this embodiment. Reference numeral 201 denotes a mike (microphone) for converting the speech to an electric signal, reference numeral 202 denotes a central processing unit (CPU), reference numeral 203 denotes a read-only memory (ROM), reference numeral 204 denotes a writable memory (RAM), and reference numeral 205 denotes an output device. The signal input portion 112 and the speech input portion 101 shown in the structural block diagram of FIG. 1 comprise the mike 201 and the CPU 202. Each of the feature quantity extraction portion, data storage portion and recognition result judgement portion 114 shown in FIG. 1 is executed as the CPU 202 executes the program written into the ROM 203 and gains access to the RAM 204.

The speech input portion 101, the noise input portion 105 and the signal input portion 112 comprise the mike 201 and the CPU 202. Each of the speech feature quantity extraction portion 102, the speech learning HMM portion 103, the noise feature quantity extraction portion 106, the clustering portion 107, the noise learning HMM portion 108, the noise HMM synthesis portion 115, the signal feature quantity extraction portion 113, the NOVO-HMM calculation portion 110 and the recognition result judgement portion 114 is executed when the CPU 202 executes the program written into the ROM 203 and gains access to the RAM 204. At this time, each of the speech HMM storage portion 104, the noise HMM storage portion 109 and the NOVO-HMM storage portion 204 comprises the RAM 204.

Figure 3:
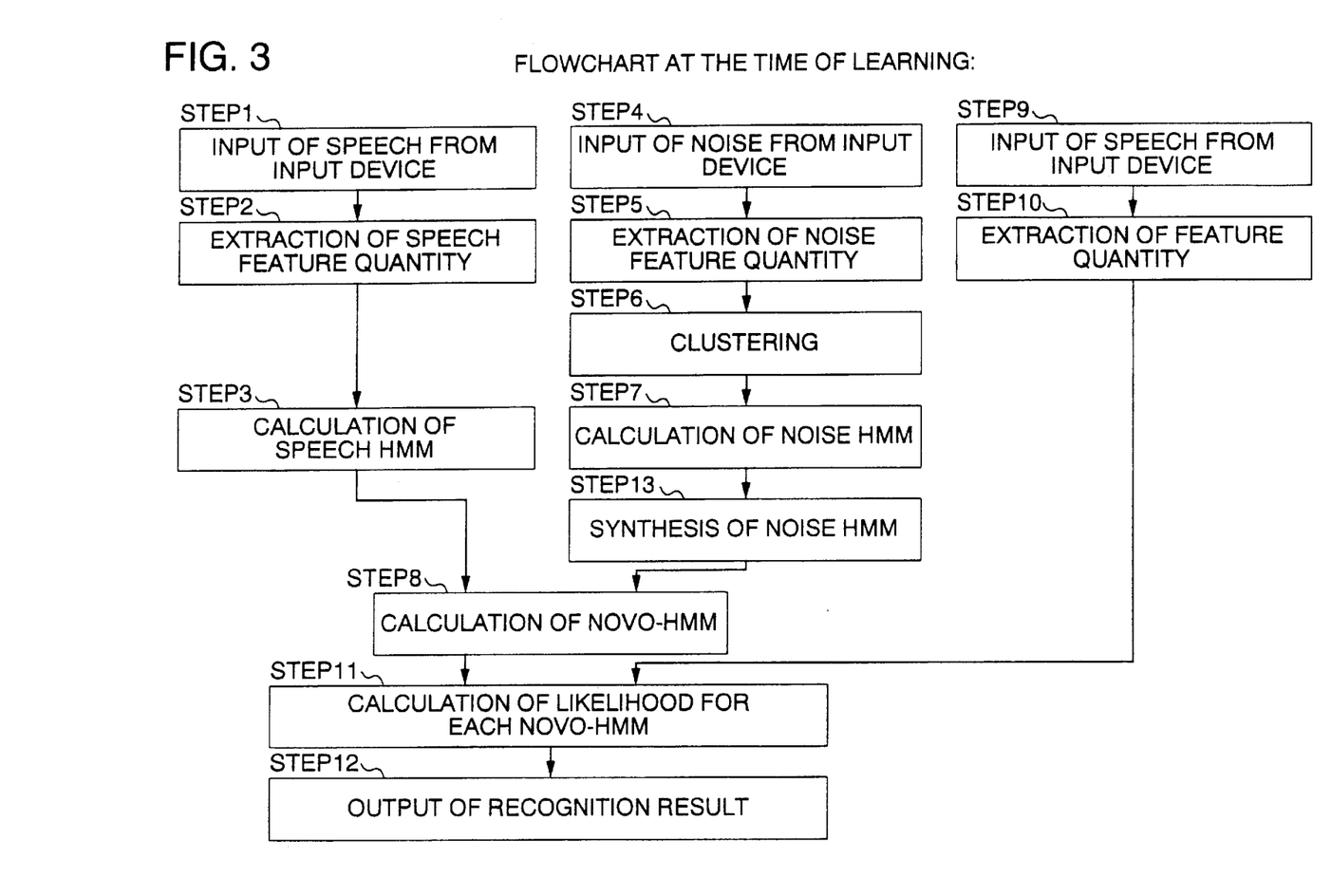
FIG. 3 is a flowchart of a speech recognition method according to the Embodiment 1 of the present invention.

FIG. 3 is a flowchart of a speech recognition method according to this embodiment. First, the speech as the reference pattern is inputted from the speech input portion 101. Dozens to hundreds of speech waveforms per reference pattern are collected and used as the input (step 1). Frequency analysis is effected for the speech zone of the speech waveforms by an analysis method such as LPC (Linear Predictive Coding) cepstram analysis (step 2). A reference speech HMM as the reference pattern for indefinite speakers is generated by using a forward-backward algorithm on the basis of these speech frequency analysis data (step 3).

Next, unsteady noise of the place where the speech recognition apparatus is used is inputted from the noise input portion 105 (step 4). Frequency analysis is effected for this noise signal by an analysis method such as LPC cepstram analysis (step 5). The noise signal is separated to a more analogous noise signal on the basis of the power reference (step 6). Alternatively, the noise signal can be separated by a spectral distance of the power spectrum. For example, the distance scale of LPC cepstram can be used as the separation reference in this instance. The noise of each cluster so separated is interconnected with one another on the basis of these noise frequency analysis data, and a noise HMM serving as the reference pattern of each noise is generated by the forward-backward algorithm (step 7).

Each noise HMM is synthesized to one noise HMM by a noise HMM synthesis method which will be later described, and the noise HMM so synthesized is stored in the noise HMM storage portion 109. NOVO conversion is effected with each noise HMM stored in the noise HMM storage portion 109 for each reference speech stored in the speech HMM storage portion 104 (step 8).

When an unknown speech is inputted, a likelihood calculation is made in the following way, and the word name corresponding to NOVO-HMM which outputs the maximum likelihood is outputted as a recognition result to the output device 205. More concretely, when the speech is inputted to the mike 201 (step 9), the feature quantity obtained through the signal feature quantity extraction portion 113 is written into the RAM 204 (step 10). Next, likelihood to the feature quantity on the RAM 204 is calculated for the NOVO-HMM generated for each reference speech stored in the ROM 203 (step 11). The word name corresponding to the NOVO-HMM that outputs the maximum likelihood is outputted as a recognition result to the output device 15 (step 12).

Generally, the reference HMM collects the speech waveform data of the word determined in advance depending on the object of application of the speech recognition (step 1), executes the extraction of the speech feature quantity (step 2) and the reference speech HMM calculation (step 3), and stores HMM as the reference pattern in the ROM 203.

If the object of use of the speech recognition apparatus is single and the noise of the environment in which the speech recognition apparatus is used remains unaltered, the noise data under the environment of use is collected in advance (step 4), and the procedures ranging from the extraction of the noise feature quantity (step 5), clustering (step 6), calculation of the noise HMM (step 7), synthesis of the noise HMM (step 13) and synthesis of the reference speech HMM and the noise HMM (step 8) are executed, and the HMM after this synthesis can be stored in the ROM 203.

Figure 4:
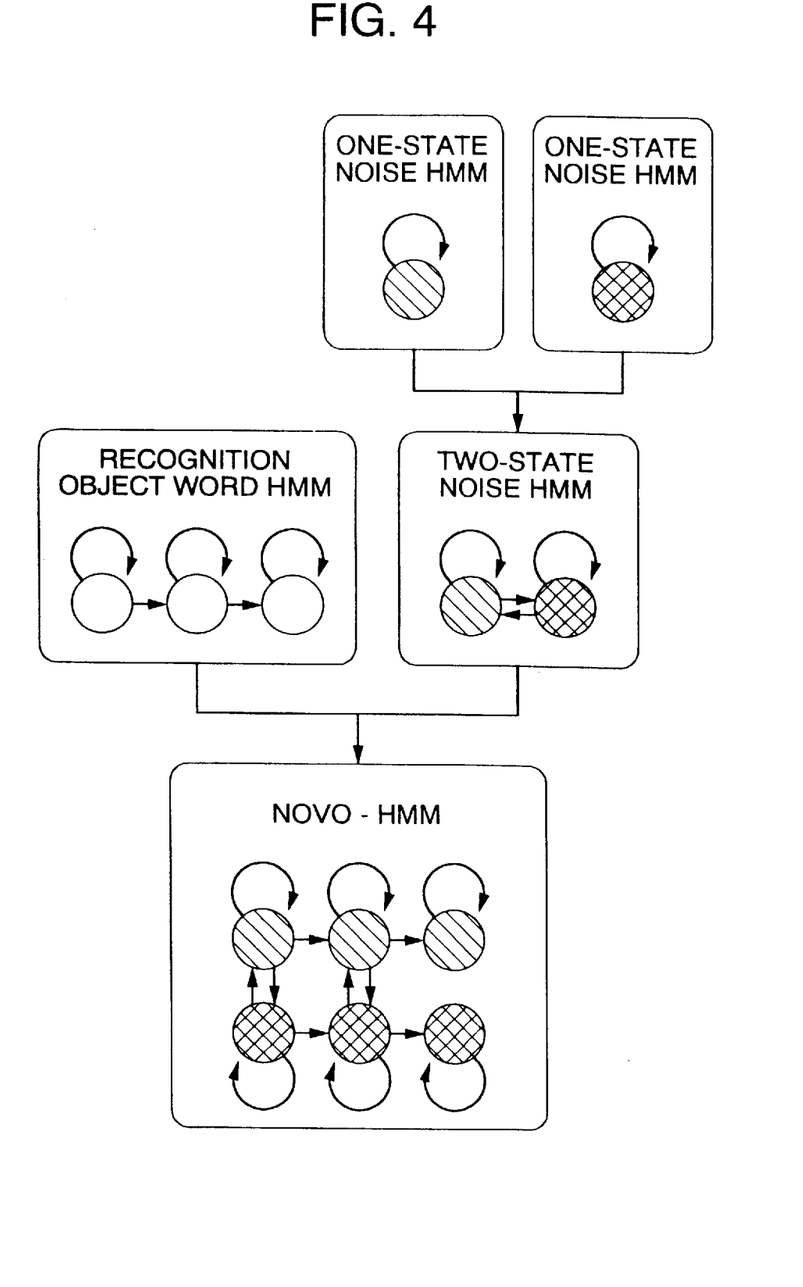
FIG. 4 is a conceptual view of NOVO conversion used for the speech recognition method of Embodiment 1 of the present invention.

FIG. 4 is a conceptual view of the NOVO conversion used for the speech recognition method in this embodiment. When the method is used in the environment where a plurality of kinds of noises change in mixture, a plurality of kinds of noise HMMs learned from the changing noises by the noise HMM learning portion are used. FIG. 4 shows the example where two kinds of noises are learned and processed. One state of noise HMM is generated by learning from each of two kinds of noises, and these noise HMM states are coupled by artificially applying a state transition probability (self-transition probability of about 0.7 and a transition probability of the other state of about 0.3) so as to generate the noise HMMs of two states. NOVO conversion is effected on the basis of these two states of noise HMMs and the recognition object word HMM to generate a NOVO-HMM.

As described above, this embodiment can recognize with a high probability the speech overlapping with the noises even in the environment where a plurality of kinds of noises are inputted. For example, overlap of the noises comprising the continuation of the steady zones of about 100 ms with pulse-like noise occurs inside a car, but recognition performance can be improved even inside the car by generating the NOVO-HMM by using the noise HMM of a plurality of states.

(Embodiment 2)

Figure 6:
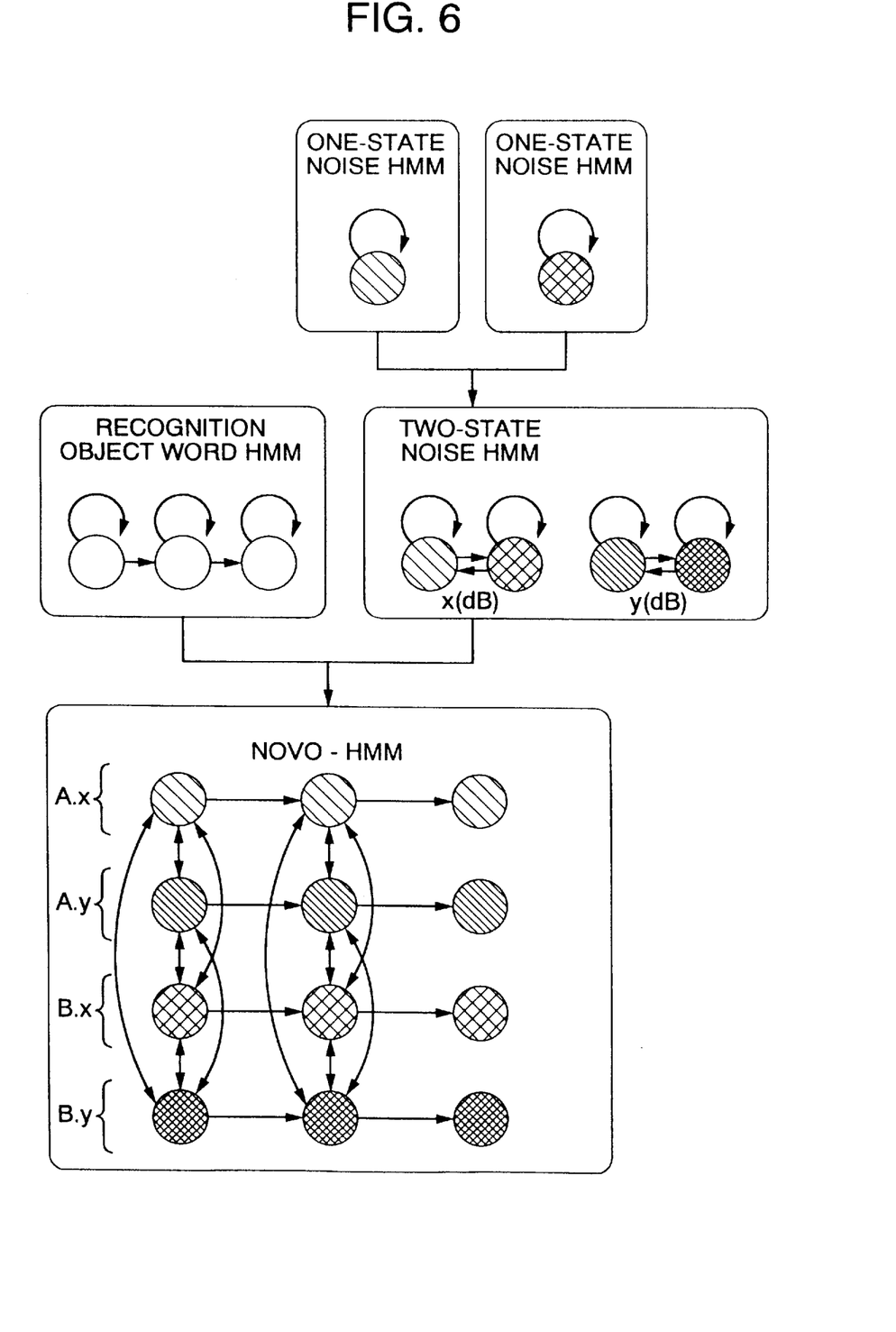
FIG. 6 is a conceptual view of Embodiment 2 of the present invention.

FIG. 6 is a conceptual view of NOVO conversion according to Embodiment 2 of this invention, and shows the generation process of the NOVO-HMM used for the speech recognition method. This embodiment pertains to the method of generating the NOVO-HMM which can recognize with a high probability the noise overlapping speech when the kind of the noise does not greatly change but the S/N ratio of the speech and the noise greatly changes.

In the Embodiment 1 described above, the two-state noise HMM is generated by combining the noise HMMs without considering the S/N ratio for various noises. In this Embodiment 2, however, one state of noise HMM is first generated by learning from each of two kinds of noises, and the states of each noise HMM are then generated in the number corresponding to the number of levels of the S/N ratios which are to be taken into consideration. FIG. 6 shows the case where the number of states of the noise HMM for NOVO conversion is 2, the kinds of noises to be considered at the time of recognition is 2, that is, A and B, and the number of levels of the S/N ratios are two stages, i.e., x[dB] and y[dB].

The states of the noise HMMs are combined by applying artificially the state transition probability among all the noise HMM states obtained by learning and copying (self-transition probability of about 0.7 and transition probability of about 0.1 for other states), and the noise HMMs of the four states are generated.

When NOVO conversion is executed on the basis of the noise HMMs under the four states and the recognition object word HMM, the NOVO-HMM shape assumes the shape in which four rows of word HMMs are aligned as shown at the lower portion of FIG. 6. Each state of the first uppermost row uses a coefficient for x[dB] of the noise A at the stage where the speech linear spectrum and the noise linear spectrum are added in NOVO conversion. Each state of the second row uses a coefficient for y[dB] of the noise A. Each state of the third row uses a coefficient for x[dB] for the noise B and each state of the fourth row uses a coefficient for y[dB] of the noise B.

According to this method, the noise overlapping speech can be recognized with a high probability even when the kind and S/N ratio of the noises simultaneously change during recognition.

Incidentally, the NOVO-HMM generated by the method described above has a greater number of states than the NOVO-HMM generated by considering only one kind of noise or only an S/N ratio of a single level. Though the calculation quantity of likelihood calculation of each NOVO-HMM becomes relatively great, re-calculation of likelihood of all the NOVO-HMMs is made by recording the kind of the noise and the S/N ratio on the route providing the maximum likelihood at the time of calculation of each NOVO-HMM, and fixing the series of the transition of the noise and the S/N ratio when the transition state of the noise becomes substantially similar to that of the S/N ratio in the NOVO-HMMs of the first several words. In this way, the calculation quantity can be drastically reduced.

(Embodiment 3)

When the noise overlapping speech is recognized, the embodiments described above use a common value as a value of k(SNR) irrespective of the kind of the noise. In practise, however, mean residual power varies depending on the kind of noise even at the same S/N ratio and the degree of the influences of the noise also varies depending on this mean residual power. Therefore, the value k(SNR) may be determined individually depending on the kind of noise.

Figure 10:
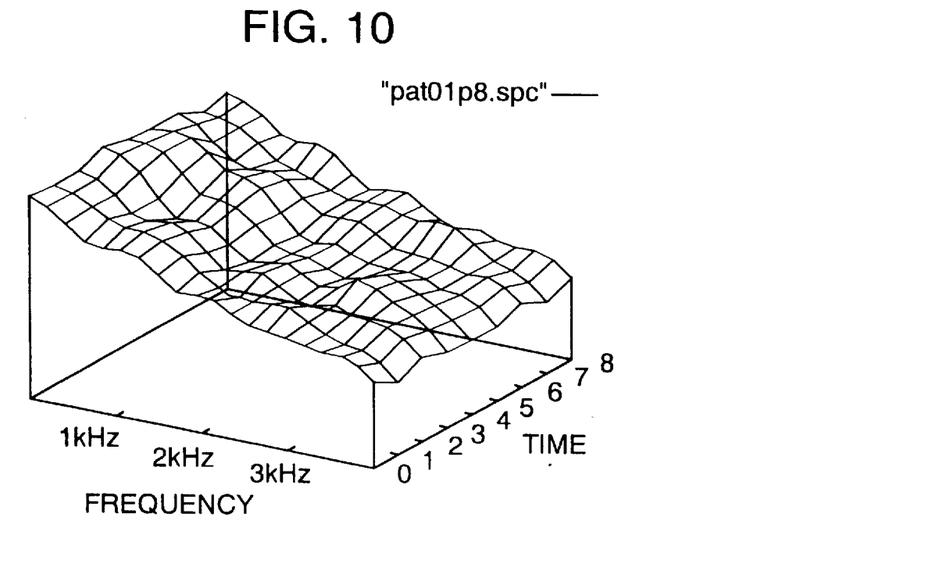
FIG. 10 is a conceptual view of a logarithmic spectrum determined from HMM generated by using a noise overlapping speech as an input.

Mean residual power of the noise comprising components having relatively high periodicity, for example, is low, and in this case, the influences of the noise on speech recognition is small. In contrast, mean residual power of the noise comprising components having low periodicity is great, and the influences of the noise become greater for such a noise having large mean residual power. FIG. 10 corresponds to this case, and a difference exists between the profiles of FIGS. 9 and 10.

When one noise HMM is synthesized from the noise HMMs of various noises by the noise HMM synthesis portion 115, weighting is effected in this embodiment by the ratio of mean residual power of the reference speech and mean residual power of the noise in each noise HMM, and each noise HMM is multiplied by an individual weighting coefficient to synthesize the speech.

Figure 5:
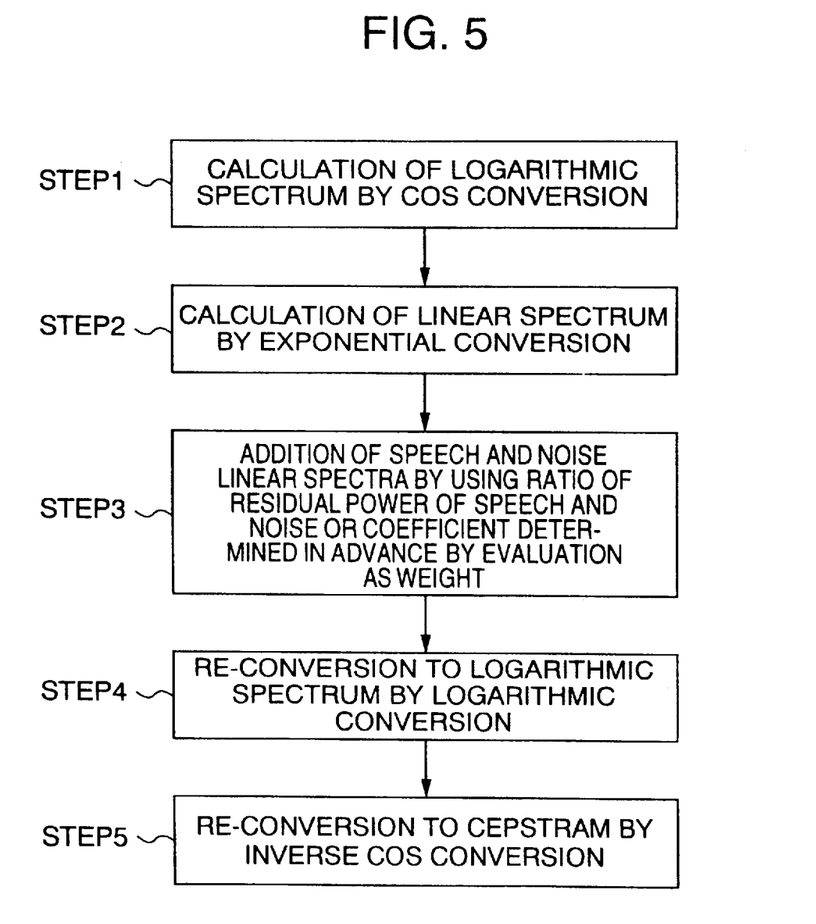
FIG. 5 is a flowchart of the calculation procedure of NOVO conversion used for a speech recognition system according to Embodiment 1 of the present invention.

FIG. 5 is a flowchart of the calculation procedures of internal parameters of the HMM in the NOVO conversion used for the speech recognition system of this embodiment. In this NOVO conversion, the cepstrams as the internal parameters of the reference speech HMM and the noise HMM are converted to logarithmic spectra by the COS conversion (step 1).

Next, exponential conversion is executed for both of them to determine the linear spectra (step 2). Mean residual power of the reference speech and that of the noise are individually determined. They can be easily determined because the term of the residual power is contained in the internal parameter of each HMM. Next, weighting is made by the ratio of mean residual power of the reference speech to that of the noise, and two linear spectra are added (step 3). The following two methods may be conceivable at the step 3.

The first method uses the ratio of mean residual power of the reference speech to that of the noise as a coefficient, and weighting is made by multiplying this coefficient to add the two linear spectra. The second method arbitrarily applies a weighting in advance to generate a provisional NOVO-HMM, and repeats the evaluation processing by changing the weighting to determine a weighting value having a high recognition ratio. Thereafter, weighting is made by using the value as a coefficient and two linear spectra are added. At the step 3, the linear spectra are added by either of these methods.

In this way, the linear spectra of the overlapping reference speech and noise are generated. The linear spectra generated in this way are then subjected to logarithmic conversion (step 4) and to inverse COS conversion (step 5) to obtain the cepstram of the overlapping reference speech and noise.

The calculation equations (1) and (2) of the addition portion of two linear spectral illustrated in the paragraph of the Prior Art are modified into the following equations (4) and (5), respectively:

(Eq. 4)

$$\mu^{R1n} = \mu^{S1n} + m \times k(SNR) \times \mu^{N1n}$$

(Eq. 5)

$$\Sigma^{R1n} = \Sigma^{S1n} + m^2 \times k^2(SNR) \times \Sigma^{N1n}$$

Here, a coefficient m in these equations (4) and (5) are expressed by the following equations (6) and (7):

(Eq. 6)

$$m = \sqrt{\frac{N\text{residual} - pow}{S\text{residual} - pow}}$$

(Eq. 7)

m=(coefficient determined by repetition of evaluation)

$N_{residual}$-4c and $S_{residual}$-pow in the equation represent the means values of residual power of the noise and speech used for learning of each HMM, respectively. The other meanings are the same as those defined in the foregoing equations (1) and (2).

Figure 7:
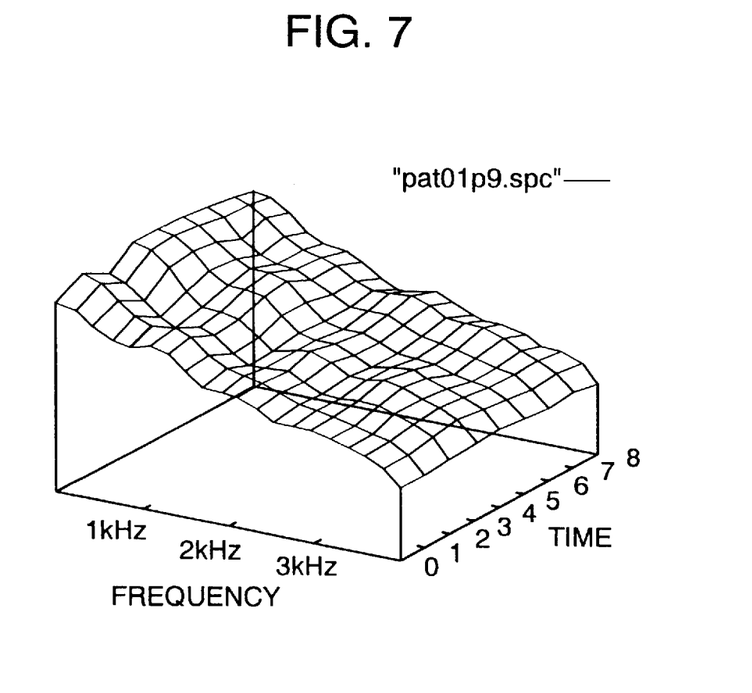
FIG. 7 is an explanatory view showing the concept of a logarithmic spectrum expressed by NOVO-HMM generated by a speech recognition system of Embodiment 3 of the present invention.

FIG. 7 shows the profile of the logarithmic spectrum expressed by the NOVO-HMM generated by the speech recognition system of the first embodiment of the invention, and it can be understood that this profile is approximate to the profile of the logarithmic spectrum expressed by the HMM obtained by inputting the noise overlapping speech. As described above, this embodiment can satisfactorily express the noise overlapping speech as shown in FIG. 7 irrespective of the kind of the noise and eventually, can recognize the noise overlapping speech with a high probability.

As described above, the present invention can recognize the speech with high accuracy irrespective of the kind of the overlapping noise by executing weighting by using the ratio of mean residual power of the speech to that of the noise as a coefficient when the reference speech HMM and the noise HMM are synthesized.

We claim:

1. A speech recognition apparatus comprising:

speech input means for effecting A/D conversion for an inputted speech;

feature quantity extraction means for extracting a frequency feature quantity by analyzing an input signal inputted from said speech input means;

speech HMM storage means for storing a reference pattern of each word to be recognized;

steady noise learning means for determining a steady noise HMM for each of a plurality of kinds of noises;

noise synthesis means for synthesizing one composite noise HMM from a plurality of said steady noise HMMs;

NOVO-HMM calculation means for synthesizing an HMM of a speech overlapping with the noise by effecting NOVO conversion of a speech HMM and said composite noise HMM synthesized by said noise synthesis means; and recognition result judgement means for executing likelihood calculation on the basis of the feature quantity of the speech signal as the object of recognition and the HMM obtained by said NOVO-HMM calculation means, and deciding the most likely word as a recognition result.

2. A speech recognition apparatus according to claim 1, which further comprises:

noise separation means for separating an inputted noise in such a manner as to be capable of approximation by a power spectrum of said noise.

3. A speech recognition apparatus comprising:

speech input means for effecting A/D conversion of an inputted speech and a noise signal;

feature quantity extraction means for extracting a frequency feature quantity by analyzing an input signal inputted from said speech input means;

speech HMM storage means for storing a reference pattern of a word to be recognized;

noise separation means for separating an inputted noise into a plurality of steady noise components in accordance with power thereof;

steady noise learning means for determining a steady noise HMM for each of a plurality of said steady noise components obtained by said noise separation means;

noise synthesis means for synthesizing a plurality of said steady noise HMMs into one composite noise HMM;

NOVO-HMM calculation means for an HMM of a speech overlapping with a noise by executing NOVO conversion of said composite noise HMM synthesized by said noise synthesis means; and recognition result judgement means for calculating likelihood on the basis of the feature quantity of the speech signal as the object of recognition and said HMM obtained by said NOVO-HMM calculation means, and deciding the most likely word as a recognition result.

4. A speech recognition apparatus comprising:

speech input means for effecting A/D conversion of an inputted speech;

feature quantity extraction means for dividing an input signal in predetermined cycle and analyzing said input signal into a frequency feature quantity for said predetermined cycle;

speech HMM storage means for storing a reference pattern of a word to be recognized;

noise separation means for separating an inputted noise into a plurality of steady noise components in accordance with power thereof;

steady noise learning means for determining a steady noise HMM for each of a plurality of steady noise components obtained by said noise separation means;

noise synthesis means for synthesizing one composite noise HMM from a plurality of steady noise HMMs;

noise HMM storage means for storing said composite noise HMM obtained by said noise synthesis means; and NOVO-HMM calculation means for synthesizing an HMM of a speech overlapping with a noise by executing NOVO conversion of a reference speech HMM of the reference pattern and said composite noise HMM synthesized by said noise synthesis means;

wherein the noise of the environment in which said speech recognition apparatus is used is first recorded, the composite noise HMM obtained by executing in advance the processing at said noise separation means, the processing at said steady noise learning means and the noise synthesis processing at said noise synthesis means is stored in said noise HMM storage means, an HMM overlapping with the noise is synthesized by executing NOVO conversion at said NOVO-HMM calculation means on the basis of the reference speech HMM of the reference pattern stored in said speech HMM storage means and the composite noise HMM stored in said noise HMM storage means, and when a speech signal as the object of recognition is inputted, likelihood is calculated on the basis of the feature quantity of the speech signal and the HMM obtained by said NOVO-HMM calculation means so as to decide the most likely word as a recognition result.

5. A speech recognition method for recognizing a noise overlapping speech by using an HMM, comprising the steps of:

generating and determining in advance and individually a plurality of steady noise HMMs from a plurality of kinds of noises;

synthesizing one composite noise HMM from a plurality of said steady noise HMMs;

synthesizing a NOVO-HMM overlapping with the noise on the basis of a reference speech HMM of a reference pattern and said composite noise HMM; and when a speech signal as the object of recognition is inputted, likelihood is calculated on the basis of the feature quantity of said speech signal and said NOVO-HMM so as to decide the most likely word as a recognition result.

6. A speech recognition method for recognizing a noise overlapping speech by using an HMM, comprising the steps of:

recording in advance a noise of the environment in which a speech recognition apparatus is used;

separating the noise into a plurality of steady noise components in accordance with power thereof;

determining a steady noise HMM for each of a plurality of steady noise components so separated;

synthesizing one composite noise HMM from a plurality of said steady noise HMMs;

synthesizing a NOVO-HMM overlapping with the noise on the basis of a reference speech HMM of a reference pattern and said composite noise HMM; and when a speech signal as the object of recognition is inputted, likelihood is calculated on the basis of the feature quantity of said speech signal and said NOVO-HMM so as to decide the most likely word as a recognition result.

7. A speech recognition method for recognizing a speech overlapping with a noise by using an HMM, in which when a word HMM used for recognition is generated, a noise HMM generated in advance from a plurality of kinds of noises is used, and when a recognition object word HMM and a noise HMM are coupled by NOVO conversion, a plurality of levels of S/N ratios are taken into consideration so that even when the kind of the overlapping noise and the S/N ratio change during recognition, the speech can be recognized with a high probability.

8. A speech recognition method for recognizing a speech overlapping with a noise by using an HMM, in which when likelihood of each word HMM is calculated by taking a plurality of noises and a plurality of levels of S/N ratios into consideration, the kind of the noise on a route providing the maximum likelihood is recorded, when the transition state of the kinds of the noises becomes substantially similar in the first several word HMMs, likelihood of each of said word HMMs is calculated by fixing the transition series of the noise to a preceding transition state, and the calculation quantity is thus reduced.

9. A speech recognition method for recognizing a speech overlapping with a noise by using an HMM, in which when a reference speech HMM and a noise HMM are synthesized so as to generate a NOVO-HMM used for recognition, weighting is effected by using a ratio of mean residual power between the speech and the noise as a coefficient.

10. A speech recognition method for recognizing a speech overlapping with a noise by using an HMM, in which in order to generate a NOVO-HMM used for recognition, a processing for generating and evaluating a provisional NOVO-HMM by applying in advance an arbitrary weighting coefficient is repeated by changing the weighting coefficient so as to obtain a weighting coefficient having a high recognition ratio, and when a NOVO-HMM used practically for recognition is generated, said weighting is effected by using said coefficient determined in advance.

* * * * *